Dec. 17, 1946. F. BERRY Re 22,818

EXPANSIBLE CHAMBER MOTOR OF THE ROTARY ABUTMENT TYPE

Original Filed Jan. 2, 1941 4 Sheets-Sheet 1

Inventor

Frank Berry

By Mason Fenwick & Lawrence

Attorneys

Dec. 17, 1946. F. BERRY Re 22,818

EXPANSIBLE CHAMBER MOTOR OF THE ROTARY ABUTMENT TYPE

Original Filed Jan. 2, 1941 4 Sheets-Sheet 2

Inventor

Frank Berry

By Mason Fenwick & Lawrence

Attorneys

Dec. 17, 1946. F. BERRY Re 22,818

EXPANSIBLE CHAMBER MOTOR OF THE ROTARY ABUTMENT TYPE

Original Filed Jan. 2, 1941 4 Sheets-Sheet 3

Inventor

Frank Berry

By Mason Fenwick & Lawrence

Attorneys

Dec. 17, 1946. F. BERRY Re 22,818

EXPANSIBLE CHAMBER MOTOR OF THE ROTARY ABUTMENT TYPE

Original Filed Jan. 2, 1941 4 Sheets-Sheet 4

Inventor

Frank Berry

By Mason Fenwick & Lawrence

Attorneys

Reissued Dec. 17, 1946

Re. 22,818

UNITED STATES PATENT OFFICE 22,818

EXPANSIBLE CHAMBER MOTOR OF THE ROTARY ABUTMENT TYPE

Frank Berry, Corinth, Miss.

Original No. 2,297,529, dated September 29, 1942, Serial No. 372,923, January 2, 1941. Application for reissue September 27, 1943, Serial No. 504,001

6 Claims. (Cl. 123—13)

This invention relates to rotary motors, and more particularly to such motors utilizing a rotary abutment operating in synchronism with a rotor and piston to seal the power chamber, and is a continuation-in-part of my copending application Ser. No. 331,226, now matured as Patent No. 2,290,027.

Rotary motors of this type are well known and the theoretical advantages of increased power and smoothness of operation of such a motor over the reciprocating motor is recognized, but due to pressure losses between the rotor and the abutment at their point of peripheral contact, and overheating because of the increased ratio of the length of the power stroke to the total revolution of the rotor, this type of motor has never been very practical in use. Many improvements have been devised in an effort to correct these defects, but the use of the rotary motor is still quite limited.

Many rotary motors having rotary abutments control the inlet and exhaust of power gases by means of valve openings in the abutment. As these valves are closed during the greater part of the rotation of the rotor, no scavenging of the burnt gases of combustion is provided for. Hot gases remaining in the cylinder tend to overheat the motor, as well as to mix with the fresh gases drawn into the combustion chamber.

The primary object of this invention is to provide means to perfect the sealing of the power chamber of a rotary motor by materially decreasing the necessary amount of line contact between the rotor and the abutment, and substituting broad areas of surface contact between the abutment and the cylinder walls while maintaining maximum size of piston and cylinder.

A further object of the invention is to reduce the length of travel of the piston in the socalled "dead spot," or the length of stroke necessary from the time the abutment breaks its seal with the rotor and the piston passes the abutment, to the time when seal is again made.

The invention contemplates means to compress air ahead of the piston, to be subsequently mixed with fuel to provide a charge to be injected under pressure into the motor.

Another object is the provision of means to allow the exhaust gases to escape around the piston before the piston has reached the abutment, and to provide for a surge of compressed air into the cylinder to scavenge the burnt gases and cool the cylinder.

The invention also provides means to extend the useful expansion of gases trapped within the abutment by permitting the gases to escape after the inlet valve is closed and the piston opening in the abutment has passed the mouth of the cylinder, thus giving more power to a given charge of fuel.

An important object of the invention is to provide improved means to cool all moving parts of the motor as well as the casing.

An additional purpose of this invention is to provide a rotary motor of simple design that can be readily converted from an internal combustion engine to one powered by steam or compressed air or into an air compressor or a fluid pump.

Various other objects will become apparent in the following description of preferred embodiments of the invention taken in conjunction with the accompanying drawings in which.

Figure 1:
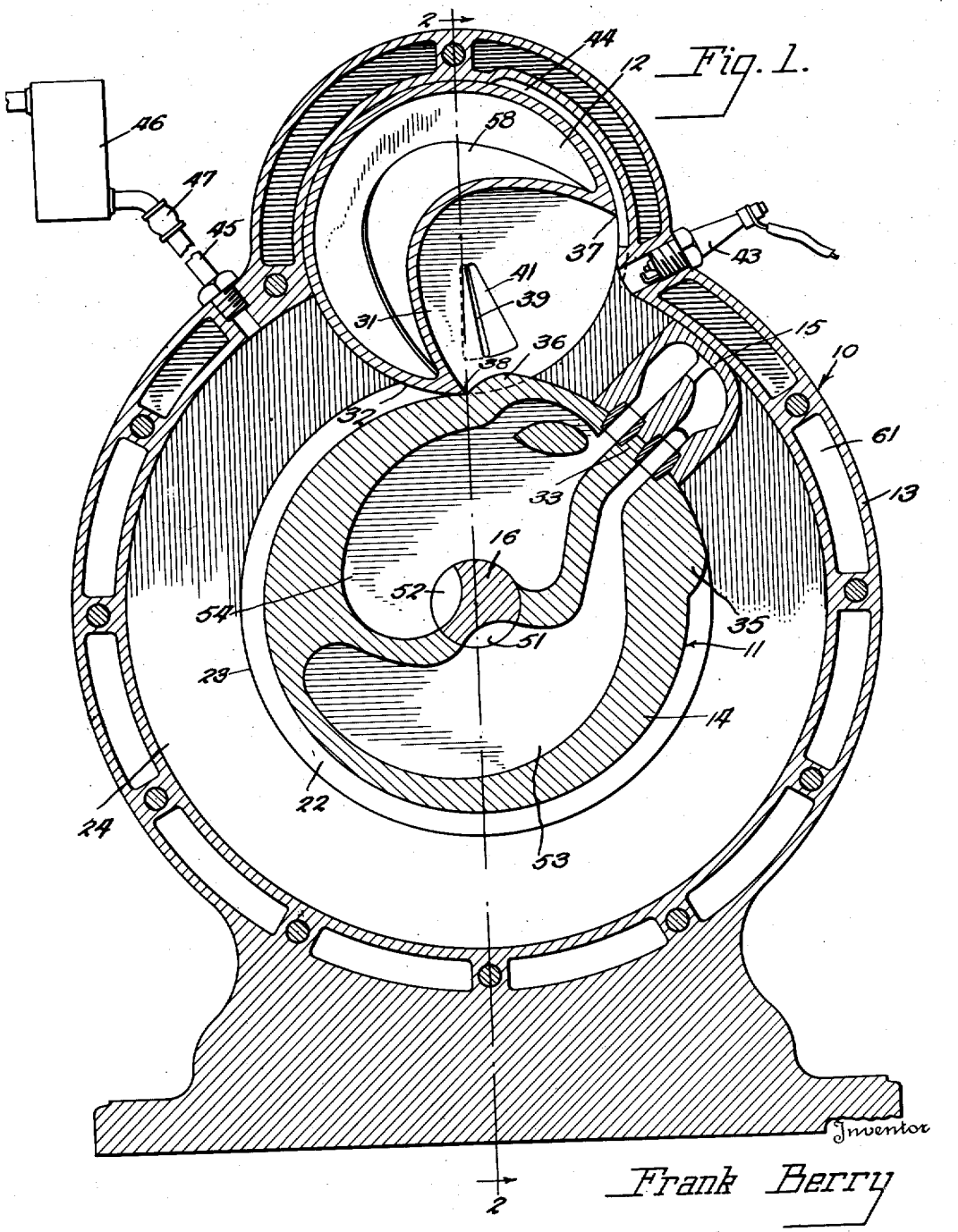
Fig. 1 is a vertical cross-section of a rotary motor embodying the concepts of the present invention, and is taken on the line 1—1 of Fig. 2.
Figure 2:
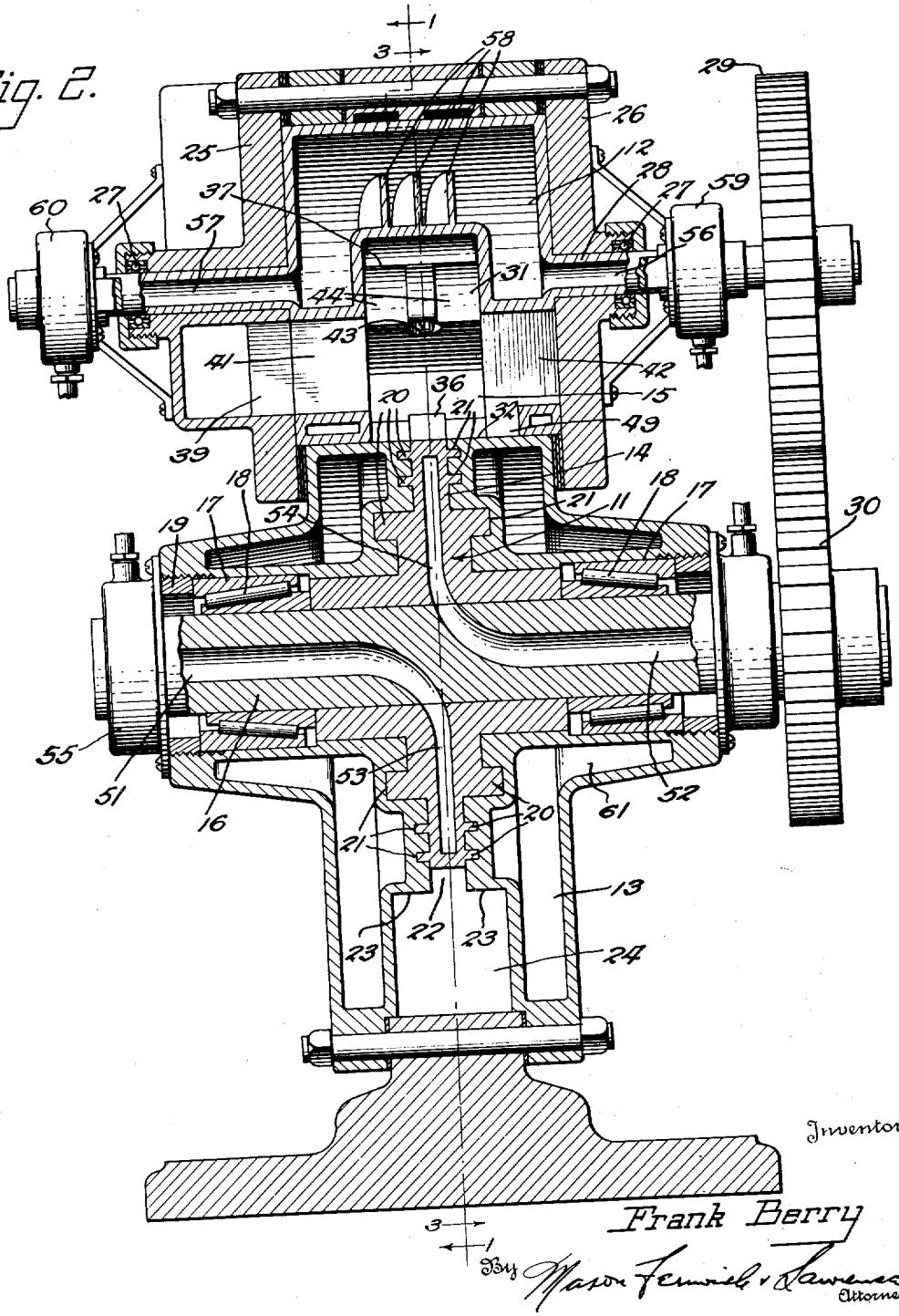
Fig. 2 is a vertical cross-section taken along the line 2—2 of Fig. 1.

Referring to the drawings in detail, a motor 10 is shown comprising a rotor 11, a rotary abutment 12, and a casing 13 to house the rotor and rotary abutment. The rotor 11 comprises a flywheel 14 and a piston 15, and is mounted upon a central shaft 16 which is journaled at 17 in the casing. Antifriction bearings 18 support the shaft within the journals and may be of the cone type and be adjustable by means of the ring nut 19 to properly align the shaft and maintain the rotor in perfectly centered position at all times. Flywheel 14 is made heavy to ensure balance and smoothness of operation, and is provided with a plurality of annular concentric fins 20 on either side face which seat in matching concentric grooves 21 in the side walls of the casing and serve the dual purpose of providing a stepped joint between the rotor and the casing to prevent power losses, and as an added means to maintain the rotor in proper position. The relatively narrow chamber 22 formed in the casing to receive the flywheel is so machined as to closely embrace the flywheel and provide a precision running fit.

It will be noted from the drawings that the rotor chamber 22 extends beyond the periphery of the flywheel to a point where annular shoulders 23 are formed on the casing where the relatively narrow rotor chamber is expanded to form an annular cylinder 24 in which the piston 15 travels. The cross-sectional width of the cylinder is preferably several times that of the rotor chamber and that portion of the rotor chamber which extends beyond the periphery of the flywheel serves as part of the cylinder.

Extending through the upper part of the casing with its axis parallel to the rotor shaft is the cylindrical rotary abutment 12. Cap plates 25 and 26 are secured to either side of the casing and are provided with bearings 27 to support the abutment shaft 28. Fixed to one end of the abutment shaft 28 is a gear 29 in mesh with a gear 30 fixed to the rotor shaft, the gears being of 1 to 1 ratio so that the abutment will make one revolution in synchronism with each rotation of the rotor. The abutment is provided with an opening 31 the width of the piston and of a depth sufficient to permit passage of the piston as it passes through the abutment at the completion of each stroke.

The function of the abutment, as its name implies, is to form a wall across the cylinder against which the expanding gases of combustion may abut to force the piston around the cylinder, and so rotate the rotor shaft. It is of the utmost importance, therefore, that there shall be no leakage of this high pressure gas around the abutment. The problem of sealing the lines of juncture between the abutment and the casing is a relatively simple one, as the abutment passes through the casing and broad areas of surface contact are provided which will effectually prevent leakage. The problem of sealing between the abutment and the rotor has been a much more difficult one as the abutment and rotor rotate and are only in peripheral contact, which permits mere line contact between the two members. According to prior practice in which the rotor and the piston were of substantially equal cross-section, a seal consisting only in line contact between the rotor and abutment across the entire broad area of the cylinder was depended upon to hold the gas pressure.

In the practice of the present invention, the annular shoulders 23, which form the greater portion of the inner wall of the cylinder, are recessed, as at 32, to provide seats for the abutment, whereby the periphery of the abutment may be positioned below the level of the main inner wall of the cylinder and in contact with the narrow peripheral face of the rotor. Thus, line contact for sealing has been reduced to a minimum and exists merely across the narrow rim of the rotor, while broad areas of surface contact between the rotor and the inner cylinder wall provides for maximum sealing across the greater area of the cylinder.

Because the flywheel is narrower than the piston and terminates below the inner wall of the cylinder, it is necessary that an extension 33 to the flywheel be provided, upon which to mount the piston. This extension rises to a plane flush with the shoulders 23, and the piston is secured to it by means of the bolts 34. The extension also provides a ridge 35 in front of the piston and a ridge 36 in back of the piston flush with the shoulders 23. These ridges are utilized to materially diminish the length of time necessary for the seal to be broken to permit passage of the piston through the abutment. The outer surface of the ridges 35 and 36 coact with the leading and trailing edges 37 and 38 of the opening 31 in the abutment to maintain prolonged sealing of the cylinder.

As the piston approaches the end of its power stroke, the leading edge 37 of the opening in the abutment will reach the point at which contact between the abutment and the flywheel is made. At this time the leading edge 37 will contact the flywheel at its juncture with the ridge 35. Continued movement of the rotor and abutment will cause the leading edge 37 to follow the curved face of the ridge 35 in contact therewith, until the leading edge of the abutment opening reaches the ends of the recesses in the shoulders 23. Until such time as the leading edge leaves the recesses the seal will be maintained. The combined function of the recesses in the shoulders and the ridge on the rotor makes this possible. After the piston has passed the abutment, the trailing edge 38 of the opening will pass onto the curved surfaces of the recesses 23 at the same time contact the ridge 36 at the back of the piston and follow it downwardly until contact with the periphery of the flywheel is made. Thus, it will be seen that a seal is maintained after the leading edge of the abutment opening has passed the point of peripheral contact between the abutment and the rotor, and that a seal is made before the trailing edge of the opening has reached this point.

Cap plates 25 and 26 are closely fitted against the ends of the abutment and carry inlet and exhaust ports 39 and 40 respectively communicating with a source of precompressed gas, not shown, and the atmosphere. Matching ports 41 and 42 are formed in the side walls of the abutment and extend through to the piston opening 31 and thus communicate with the cylinder when the opening 31 is in registry with the cylinder. These ports are so positioned in the cap plates and abutment that the inlet port will be open at the beginning of each revolution of the rotor and the exhaust port will be open at the end of each revolution.

Fig. 1 shows the position of the various elements when the inlet port has almost closed. As the port closes, the opening 31 in the abutment and that part of the cylinder between the piston and the abutment will be filled with precompressed gas taken in through the inlet port. This gas will be fired by means of a spark plug 43 and begin to expand, causing the rotor to turn. The abutment will rotate in a counterclockwise direction and the trailing edge 38 of the opening in the abutment will seal off the cylinder from the opening 31, trapping the unexpanded gas within the opening 31. Under prior practice this gas has been lost, as it passed out of the exhaust port when the port was opened. To furnish added power to the piston as well as to utilize this ordinarily wasted gas, bleeder grooves 44 are formed in the casing overlying a portion of the abutment and communicating with the cylinder. With this construction, gas within the opening 31 may continue to expand at the same rate as the gas in the cylinder, as long as the opening 31 is in registry with the bleeder grooves.

Means are provided to compress air ahead of the piston to be used to mix with the fuel to provide a precompressed volatile charge for the motor. It is known that on opening the exhaust valve of an internal combustion engine, the highly compressed gases emerge with such force as to produce a slight vacuum behind them in the cylinder, causing an inrush of fresh air through the exhaust port into the cylinder. An outlet pipe 45 leads from the cylinder near the exhaust end of the cylinder to any desired storage chamber 46 for compressed air and as the rotor rotates, air which rushed into the cylinder following the explosive emergence of the burnt charge will be forced out through the pipe 45 into the chamber 46. Continued rotation of the motor will build up a pressure within the chamber, the compressed air being held in the chamber by a check valve 47. Obviously a certain amount of compressed air will be trapped within the pipe 45, between the check valve and the cylinder at such time as the piston, in its travel, covers the outlet 45.

Figure 3:
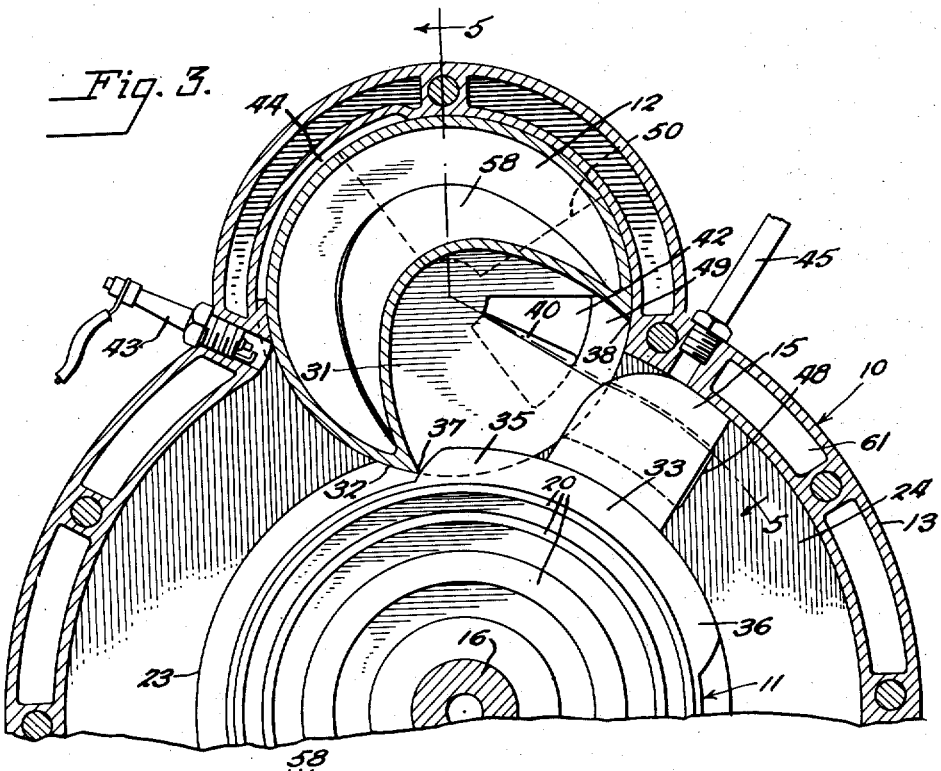
Fig. 3 is a vertical cross-section similar to Fig. 1 but viewed in the opposite direction, and is taken on the line 3—3 of Fig. 2.
Figure 5:
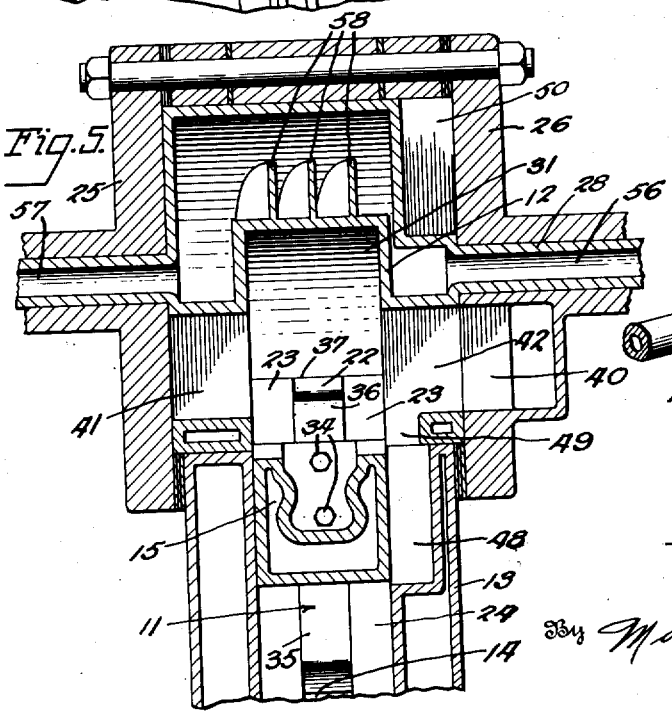
Fig. 5 is a section taken on the line 5—5 of Fig. 3.
Figure 6:
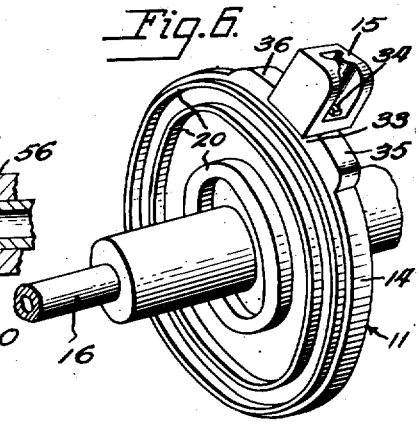
Fig. 6 is a perspective view of the shaft and rotor with the piston attached.
Figure 7:
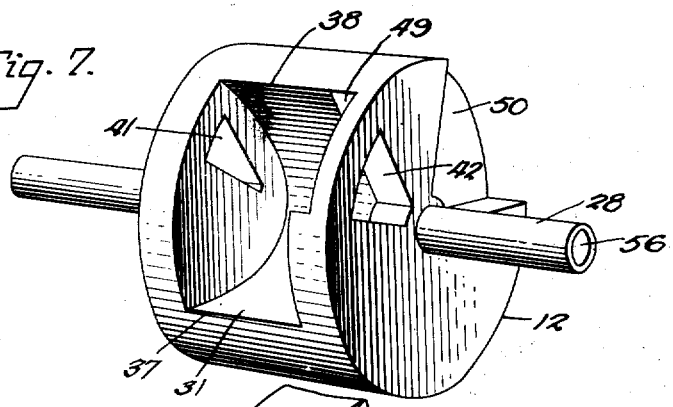
Fig. 7 is a perspective view of the rotary abutment.
Figure 4:
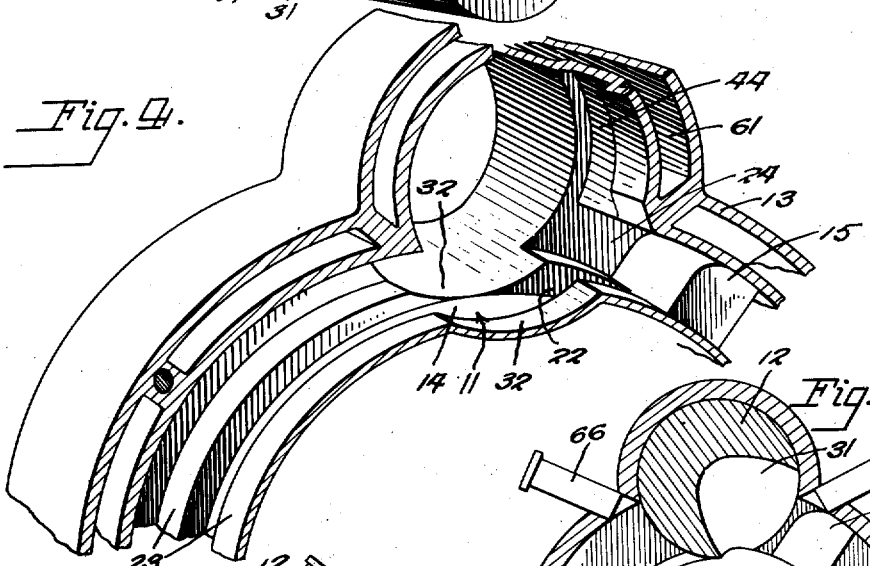
Fig. 4 is a perspective view of a portion of the rotor and associated parts of the casing illustrating the bearing seat for the rotary abutment.
Figure 9:
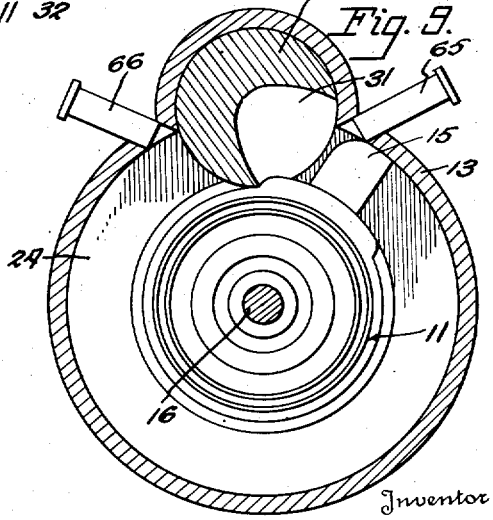
Fig. 9 is a cross-section of a motor converted for use as an air compressor or pump.

In order to utilize this trapped compressed air in pipe 45 to aid in scavenging the cylinder, it is necessary that the air be held in the pipe 45 while the gas behind the piston is exhausted. This is also necessary to preclude any possibility of the burnt gases behind the piston entering the air pipe 45. To accomplish this a by-pass 48 is provided in the cylinder side wall which extends from the abutment to a point beyond the air outlet. When the piston reaches a position where it covers the air outlet pipe, as is shown in Fig. 3, the piston will have uncovered the end of the by-pass 48, which by-pass will then be in communication with a recessed extension 49 of the exhaust port 42 of the abutment, and the port 42 will be commencing to open the port 40. Burnt gases behind the piston may then exhaust through by-pass 48, recess 49 and ports 42 and 40, bringing the gases behind the piston to vacuum pressure, which causes fresh air to be sucked in through the exhaust port. As the piston moves forward and uncovers the pipe 45, the compressed air in the pipe 45 between the check valve and the cylinder will expand back into the cylinder scavenging the cylinder forcing some of the air in the cylinder out through the exhaust port, which is open to its fullest extent, and further diluting any residual gases which may have been left in the cylinder.

The side face of the abutment containing the exhaust port may also have formed therein recess 50, which communicates with the exhaust port 40 in the casing and the by-pass 48 during that portion of the cycle of operation of the motor immediately following the firing of the charge. This will permit the air ahead of the piston to discharge to the atmosphere, the extent and position of the recess 50 determining the point in the cycle of rotation at which the piston will begin to compress air.

Cooling of the motor is accomplished by circulating a cooling fluid through the rotor, abutment and casing. The various passageways for the cooling medium are so shaped and arranged as to utilize the centrifugal force set up by the rotating members to promote the circulation of the fluid. Inlet and outlet conduits 51 and 52 are provided in the rotor shaft 16 which lead into and from the chambers 53 and 54 in the rotor. The walls of the chamber 53 are smooth curves, and the chamber tapers from the wide area at its juncture with inlet 51 to the narrow passageway leading to the piston 15. This narrowing of the chamber increases the velocity of the fluid as it passes through the piston, providing a greater rate of heat exchange in the piston and added cooling at that important point. When the water passes out of the piston into the enlarged chamber 54 its velocity is reduced before it passes out through the conduit 52. A pump 55 may be mounted on one end of the rotor shaft as a positive means of forcing the fluid through the conduit and a collecting chamber may be fixed at the opposite end of the shaft.

Abutment shaft 28 is hollow to provide inlet and outlet conduits 56 and 57 leading into and out of the cored out body portion of the abutment. Angularly arranged fins 58 extending from the abutment walls aid in the circulation of the fluid through the abutment. A pump 59 and a collecting chamber 60 may be mounted on the opposite ends of the abutment shaft. The several pumps and collecting chambers of the rotor and abutment may be connected together to form a complete circulation system for the cooling fluid through the rotor and abutment, or the rotor and abutment may each have independent systems. The motor casing is water jacketed as at 61 for cooling the cylinder walls.

Figure 8:
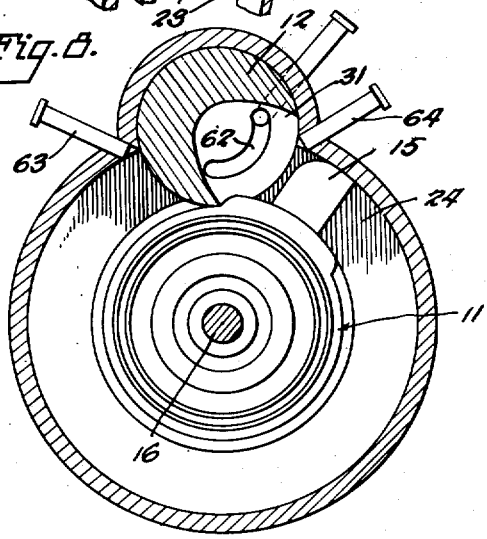
Fig. 8 is a cross-section of a motor converted for the use of steam or compressed air as the propellant gas.

In Fig. 8 is shown a motor constructed in accordance with the present invention, which has been converted for use with steam or compressed air as a power medium. An intake 62 is provided in the abutment for the admission of a uniform charge of steam or air, and an exhaust outlet 63 allows the expanded charge to exhaust as soon as the piston has passed the exhaust port. When a continuous application of power to the piston is desired the intake 62 is closed and the steam or air hose is connected to the pipe 64.

To use the motor as a pump or air compressor, inlet and outlet ports 65 and 66 are provided. Power may be applied to the rotor shaft from any suitable source, and as the rotor moves, the piston will draw in liquid or air through the port 65. The first revolution of the rotor will fill the cylinder with liquid, and continued rotation will force the liquid out through the port 66.

Although one practical embodiment of the invention has been shown and described, it will be apparent that changes may be made within the scope of the appended claims.

What I claim is:

1. In a rotary motor comprising a casing having an annular peripheral chamber and an inner chamber of relatively narrower width than said peripheral chamber and communicating therewith, a shaft journalled in said casing, a cylindrical rotor on said shaft rotatively mounted in said inner chamber, the cylindrical radius of said rotor being less than the radius of said inner chamber forming an annular space about said rotor, a piston radially extending from said rotor for rotation within said peripheral chamber and of corresponding width to said peripheral chamber, ridges on said rotor for a distance on either side of the piston, filling the annular space defined by the cylindrical surface of the rotor and the projecting side walls of the inner chamber and having their upper surfaces flush with the periphery of said projecting side walls, and at their outer ends merging with the cylindrical surface of the rotor, annular shoulders on the casing at the juncture of inner and peripheral chambers constituting a major portion of the inner wall of the peripheral chamber and having arcuate recesses therein, an abutment mounted to rotate in said casing seated in said recesses in peripheral contact with said rotor and having an opening to permit passing of said piston and ridges, said abutment opening having inlet and exhaust port openings therein; whereby the ports alternately will be in communication with the peripheral chamber when the abutment opening is in registry with opposite sides of the peripheral chamber and the said abutment will maintain a seal until the leading edge of the abutment opening passes from the recess, and will make a seal when the trailing edge of the abutment opening enters said recess.

2. In a device of the class described, in combination, a rotor mounted on a shaft for rotation between spaced casing walls having a radius from the said shaft greater than the radius of the rotor to form an annular channel of predetermined transverse width, the said spaced casing walls terminating in outwardly disposed shoulders to form an enlarged annular passage of a transverse width greater than the said predetermined with of the annular channel, the said rotor being provided with a piston slidably disposed within the said enlarged annular passage, a cylindrical abutment mounted for rotation in a chamber provided in the said casing walls, the said abutment chamber being located relatively to the said rotor to dispose the said rotary abutment in tangential relation to the said rotor, the said outwardly disposed shoulders of the spaced casing walls being provided with a pair of aligned arcuate recesses for the rotary abutment, the said rotary abutment having an opening for clearance of the said rotor piston forming a leading edge and a trailing edge in the abutment, means for admitting a fluid power charge intermediate the abutment opening and the piston when the piston is brought to a predetermined position in the movement of the rotor, and a peripheral projection on the said rotor at its said piston having a leading portion and a trailing portion relative thereto, both portions having sealing surface area extending from a high point at the said outwardly disposed shoulders of the spaced casing walls to a low point at the juncture with the rotor, the trailing edge of the abutment making initial contact with the said arcuate recesses and with the said high point of the trailing sealing surface area to increase the power stroke anteriorly of the commencement thereof, said increase ending with the said trailing edge in tangential contact with the rotor at the said low point of the sealing surface area, and the leading edge of the abutment making tangential contact with the rotor at the said low point of the leading sealing surface area to increase the power stroke posteriorly of the termination thereof, said increase ending with the said leading edge in contact with the said high point of the sealing surface area as the said leading edge leaves the said arcuate recesses.

3. In a device of the class described, in combination, a rotor mounted on a shaft for rotation between spaced casing walls having a radius from the said shaft greater than the radius of the rotor to form an annular channel of predetermined transverse width, the said spaced casing walls terminating in outwardly disposed shoulders to form an enlarged annular passage of a transverse width greater than the said predetermined width of the annular channel, the said rotor being provided with a piston slidably disposed within the said enlarged annular passage, a cylindrical abutment mounted for rotation in a chamber provided in the said casing walls, the said abutment chamber being located relatively to the said rotor to dispose the said rotary abutment in tangential relation to the said rotor, the said outwardly disposed shoulders of the spaced casing walls being provided with a pair of aligned arcuate recesses for the rotary abutment, the said rotary abutment having an opening for clearance of the said rotor piston forming a leading edge and a trailing edge in the abutment, means for admitting a fluid power charge intermediate the abutment opening and the piston when the piston is brought to a predetermined position in the movement of the rotor, a peripheral projection on the rotor at its said piston having a trailing portion relative thereto, said portion having a sealing surface area extending from a high point at the said outwardly disposed shoulders of the spaced casing walls to a low point at the juncture with the rotor, the trailing edge of the abutment making initial contact with the said arcuate recesses and with the said high point of the sealing surface area to form a pressure seal concurrently with the positioning of the piston inside the abutment opening and close to the trailing wall of the abutment, to decrease the space available for receiving the fluid charge.

4. The combination according to claim 3 wherein the said piston is further provided with a distal sealing surface area cooperative with the leading wall of the abutment to form a pressure seal closing one end of the said fluid-charge receiving space, its other end being closed by the said pressure seal between the sealing surface area of the peripheral projection and the trailing edge of the abutment.

5. In a device of the class described, in combination, a rotor mounted on a shaft for rotation between spaced casing walls having a radius from the said shaft greater than the radius of the rotor to form an annular channel of predetermined transverse width, the said spaced casing walls terminating in outwardly disposed shoulders to form an enlarged annular passage of a transverse width greater than the said predetermined width of the annular channel, the said rotor being provided with a piston slidably disposed within the said enlarged annular passage, a cylindrical abutment mounted for rotation in a chamber provided in the said casing walls, the said abutment chamber being located relatively to the said rotor to dispose the said rotary abutment in tangential relation to the said rotor, the said outwardly disposed shoulders of the spaced casing walls being provided with a pair of aligned arcuate recesses for the rotary abutment, the said rotary abutment having an opening for clearance of the said rotor piston forming a leading edge and a trailing edge in the abutment, means for admitting a fluid power charge intermediate the abutment opening and the piston when the piston is brought to a predetermined position in the movement of the rotor, and a peripheral projection on the said rotor at its said piston having a leading portion relative thereto and having a sealing surface area extending from a high point flush with the said outwardly disposed shoulders of the spaced casing walls to a low point at the juncture with the rotor, the leading edge of the abutment making tangential contact with the rotor at the said low point of the sealing surface area to form a pressure seal and remaining in contact with the said sealing surface area up to the said high point thereof as the said leading edge leaves the said arcuate recesses, to continue the said pressure seal until the piston has entered the abutment opening to a position close to the leading wall of the abutment, to decrease the space within which the fluid charge is compressed.

6. The combination according to claim 5 wherein the said piston is further provided with a distal sealing surface area cooperative with the trailing wall of the abutment to form a pressure seal closing one end of the said fluid-charge compression space, its other end being closed by the said pressure seal between the sealing surface area of the peripheral projection and the leading edge of the abutment.

FRANK BERRY.